Dec. 11, 1956     M. F. MILLER     2,773,679
MIXER
Filed May 3, 1954     3 Sheets-Sheet 1
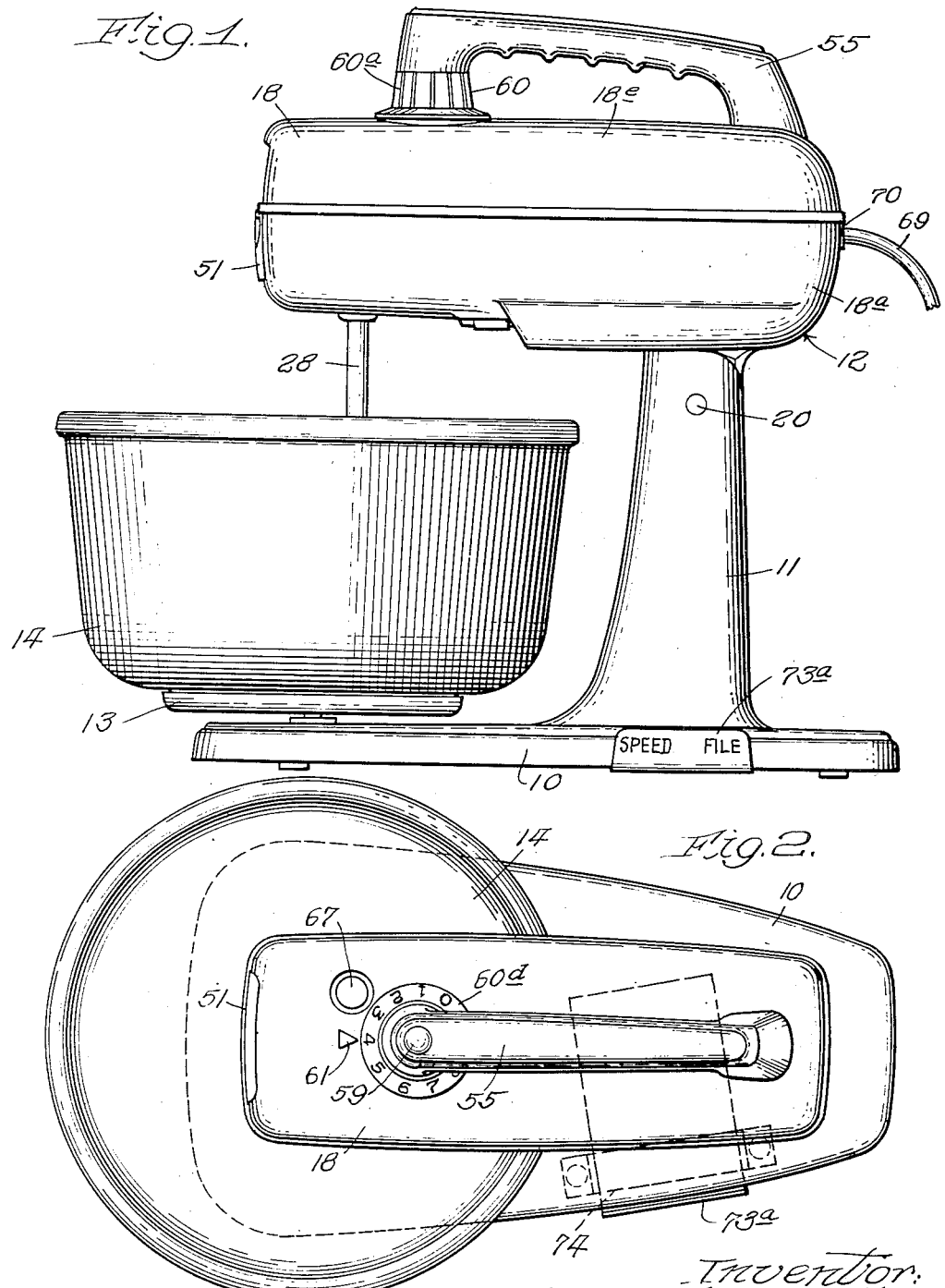

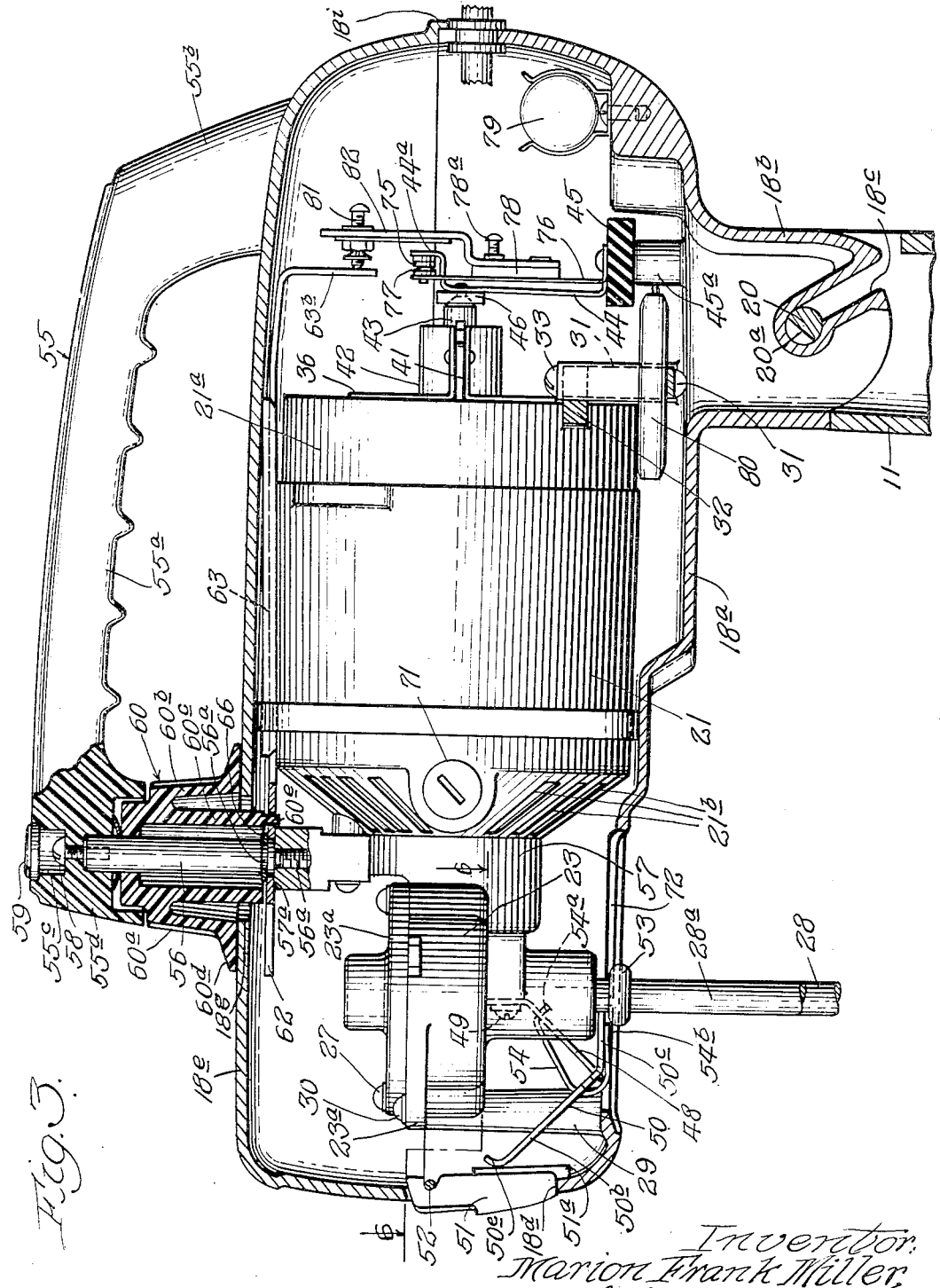

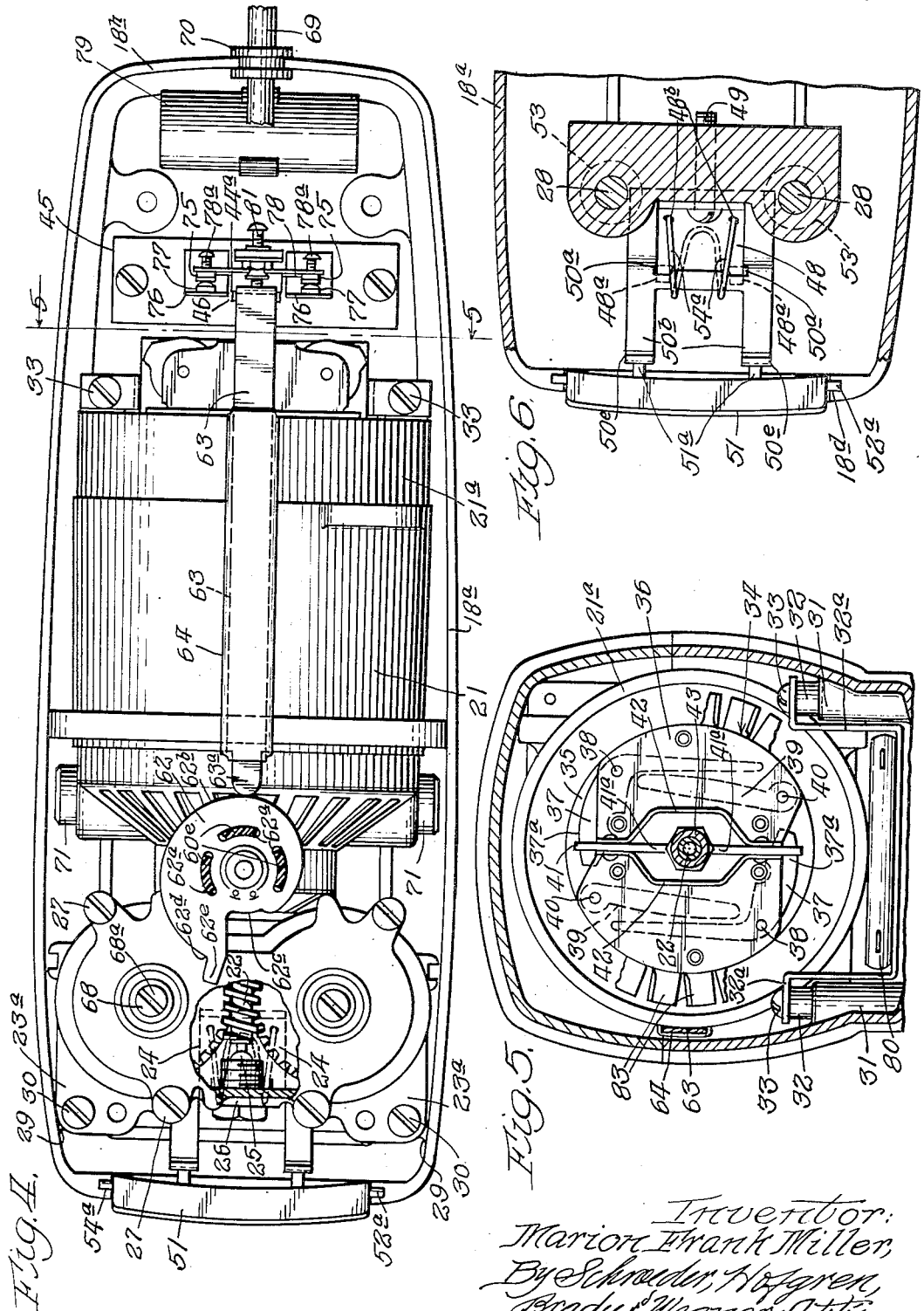

United States Patent Office 2,773,679
Patented Dec. 11, 1956

2,773,679
MIXER

Marion Frank Miller, Villa Park, Ill., assignor to Birtman Electric Company, a corporation of Illinois Application May 3, 1954, Serial No. 427,240

4 Claims. (Cl. 259—1)

This invention relates to an electric food mixer.

Electric food mixers, particularly those of the household type, ordinarily employ a removable beater or beaters for mixing the food. Many of these mixers are also of the type employing variable speed governors in order that a predetermined speed may be selected depending upon the type of food material being mixed. The mixer of the present invention is concerned with an improved motor construction including an improved speed control apparatus, and an improved ejector mechanism that is readily accessible to the operator.

One of the features of this invention is to provide an improved beater ejector apparatus for a mixer including a support member on the mixer, an ejector plate pivotally mounted on the support member having one end adapted to engage a portion of the beater and move the beater away from the mixer on pivotal movement of the plate, an operating member bearing against the other end of the ejector plate and movable for thusly pivoting said plate, and spring means urging the plate and operating member into retracted positions.

Another feature of the invention is to provide an improved apparatus for operating a speed control governor member in a motor including a casing, a handle, a handle support and a speed governor having a governor member within the casing movable through a path for regulating the motor speed, wherein this improved apparatus comprises a rotatable knob on said handle support accessible from the handle, a rotatable cam within the casing rotatable with the knob, an operating member extending between the cam and the governor member for positioning the same on rotation of the knob and cam, and bearing means rotatably supporting the cam and holding the cam in operating engagement with said knob.

A further feature of the invention is to provide an improved electric mixer comprising a motor including a motor shaft and a housing for the motor, a gear box attached to one end of the housing into which the motor shaft extends, a gear within the gear box rotatable by said shaft for rotation of a beater having one end held by said gear box, and a casing, the housing and gear box being rigidly attached together for handling, insertion into and removal from said housing as a unitary assembly.

Yet another feature of the invention is to provide an improved electric motor construction comprising a casing, a handle thereon, a motor, a gear box attached to one end of the housing into which one end of the shaft extends, a speed governor apparatus mounted on the opposite end of the shaft, the motor, housing, gear box and speed governor being attached together for handling, insertion into and removal from said housing as a unitary assembly, a handle support for the handle mounted in a portion of said assembly and extending outwardly through an opening in said case, a movable governor regulating member mounted on said housing within said casing and extending to a point adjacent to said handle support, a rotatable knob on said handle support accessible from the handle, a rotatable cam within the casing rotatable with the knob, and bearing means on said assembly rotatably supporting said cam.

Other features of the invention will be apparent in the following description of certain embodiments thereof as shown in the accompanying drawings. Of the drawings:

Fig. 1 is a side elevational view of a food mixer embodying the invention.

Fig. 2 is a plan view of the mixer of Fig. 1.

Fig. 3 is a vertical sectional elevation taken substantially through the center of the mixer motor and housing.

Fig. 4 is a plan view of the motor construction with the top half of the casing removed.

Fig. 5 is a sectional elevation taken substantially along line 5—5 of Fig. 4.

Fig. 6 is a fragmentary sectional view taken substantially along the line 6—6 of Fig. 3.

The mixer shown in the accompanying drawings comprises a base 10, an upwardly extending standard 11 and a motor structure 12 oscillatably supported by the top of the standard 11. On the forward end of the base 10 is located a rotatable platform 13 removably supporting a bowl 14 in the customary manner.

The upper end of the standard 11 is open and is provided with a pivot pin 20 extending thereacross. The bottom part 18a of the casing 18 is provided with a downwardly extending portion 18b having an upwardly and forwardly extending passage 18c therein for engagement and disengagement with the pivot pin 20. The inner end of this passage is of generally cylindrical shape and has a diameter slightly greater than the diameter of the pin 20. The remainder of the passage 18c is narrower than this diameter. The pivot pin itself is cut away as indicated at 20a with this cut-away portion sloping forwardly and downwardly. When the parts are in the position shown in Fig. 3, the motor structure 12 is firmly attached to the pivot pin 20 for oscillation through an arc. However, when it is desired to remove the motor structure 12 from the pivot pin 20 for portable use, it is only necessary to rotate the motor structure rearwardly as far as it will go and then lift upwardly on the motor structure. In this position, the narrow portion of the pivot pin 20 registers with the narrow part of the passage 18c so that the motor structure 12 can then be lifted from the pivot pin 20. When the motor structure is replaced on the pivot pin 20, the above operation is merely reversed.

The motor includes a housing 21 and a motor shaft 22 extending from the housing into a gear box 23. This gear box is attached to one end of the housing 21 and, in effect, forms an extension thereof. The extreme end of the shaft 22 is shaped as a worm engaging a pair of worm gears 24 on opposite sides thereof. The extreme end of the shaft 22 bears against a thrust ball 25 that is held in a support 26 that is screwed into the front wall of the gear box 23. This gear box has a removable cover 23a held in place by screws 27.

The gears 24 are adapted to drive a pair of beaters 28 that extend downwardly into the bowl 14. These beaters are removably held within bottom openings in the gear box 23 in the usual manner and are removed from engagement therewith by a downward movement on the beaters.

The bottom portion of the casing 18a is provided with a pair of integral bosses 29 adjacent to the front thereof. These bosses which are preferably cast as integral parts of the sidewalls of the bottom part 18a of the casing removably support the front end of the motor housing-gear box unit by means of a pair of side flanges 23a on the gear box resting on the bosses 29 and secured thereto by means of screws 30.

The rear end of the motor housing-gear box unit is similarly supported on similar cast bosses 31 on which rest flanges 32 that extend rearwardly from the housing 21. These are fastened together by means of screws 33. A metal strap 32a is provided having its ends held on the bosses 31 by means of the screws 33 with the strap passing downwardly to a point beneath an impedance 80.

The motor housing 21 is provided with a rearwardly extending circular rim 21a. Located within this rim is a speed governor 34. This speed governor includes a governor member movable through a path for regulating the motor speed over a range of speeds. The governor may be any of the usual types and thus may employ a single pair of contact points as shown and described in C. H. Sparklin Patent No. 2,532,345 dated December 5, 1950, or may employ two pairs of contact points as shown and described in C. H. Sparklin Patent 2,568,774 dated September 25, 1951, and J. P. Mayer Patent 2,586,-841 dated February 26, 1952.

In the embodiment shown, the speed governor 34 comprises a pair of substantially parallel spaced plates 35 and 36 mounted for rotation with the motor shaft 22. As is disclosed in the above Sparklin Patent 2,532,345, the centrifugally responsive members of the governor are movably positioned between the plates 35 and 36. Thus, there are provided a pair of oppositely located bell crank levers 37 having their ends between the plates and each mounted for rotation at the angular portion thereof about a pivot pin 38. Bearing against one arm of each bell crank 37 is a centrifugally responsive lever 39 pivotally mounted about a pin 40 located at one end of the arm. Outward movement of each arm 39 about its pivot 40 causes inward movement of the opposite end 37a of each bell crank lever 37. This inward movement causes rotation of a pair of second bell cranks 41 against which the arms 37a bear. These second bell cranks are mounted at right angles to the plates 35 and 36 between rearwardly extending guide flanges 41 and 42 that are mounted on the outermost plate 36.

Each second bell crank 41 has one arm 41a extending toward the shaft 22. These arms 21a are adapted to bear against the flange of a thimble 43 that is movably mounted on the end of the motor shaft 22. Thus, increasing speed of the motor causes outward movement of the centrifugally responsive arm 39 and this in turn causes outward movement of the thimble 43 along the shaft 22. This outward movement is arranged to break the electrical circuit to the series motor in order to stop acceleration of the motor at a predetermined speed depending upon the setting of the governor.

The thimble is adapted to bear against a switch mechanism, shown most clearly in Figs. 3 and 4. This switch mechanism includes a spring arm 44 mounted on a block 45 held on bosses 45a at the bottom of the lower housing section 18a. This spring arm 44 extends upwardly and has attached adjacent to the top thereof a pad 46 of felt or the like against which the end of the thimble 43 bears. The arm 44 also extends rearwardly of the pad 46 and then upwardly as shown in Fig. 3. The upwardly extending portion 44a of the arm then extends laterally on opposite sides of the central bent portion of the arm 44, as shown in Fig. 4. These laterally extending portions of the arm each carry an electrical contact 75.

Also mounted on the block 45 rearwardly of the arm 44 are a pair of spring arms 76 extending upwardly from the block and located on opposite sides of the arm 44 and slightly rearwardly thereof. The upper ends of the arms 76 each carry an electrical contact 77 adapted to engage one of the contacts 75. The mid portions of the arms 76 are connected by a transverse insulating block 78 to describe an essentially H-shaped structure. The block 78 is positioned rearwardly of the spring arm 44. The upper end of each spring arm 76 is adjustable rearwardly or forwardly relative to the block 78 and thus relative to the other arm 76 by means of an adjusting screw 78a that operates against each arm 76. Each of the two adjusting screws 78a is held in the block 78. With this arrangement the relationship of each contact 76 is adjustable relative to the corresponding contact 75 so that one pair of contacts 75 and 76 may be arranged to open and close out of timed phase with the other in the manner described more fully in the above Sparklin Patent 2,568,774, and Mayer Patent 2,586,841.

The contacts 75 and 76 are in series with the electrical circuit including the series motor, and this circuit also includes a condenser 79 and an impedance such as a resistor 80.

In order to eject the beaters from the mixer by moving the beaters outwardly of the mixer, there is provided an assembly of elements constituting a beater ejector apparatus. Thus, in the embodiment shown the beater ejector apparatus comprises a support member 48 in the form of a plate attached to the gear box 23 and extending downwardly and forwardly. This support member is attached to the gear box by means of a screw 49 that is located adjacent to the top edge of the plate. The bottom edges of the support member plate 48 is provided with a pair of forward projections 48a. These projections are adapted to be held in small openings 50a in an ejector plate 50. The ejector plate 50 has a pair of upwardly and forwardly extending bifurcations 50b that extend toward the front end of the mixer. The other end of the ejector plate 50 extends rearwardly of the support member plate 48. The side edges of this rear end of the ejector plate 50 are adjacent to the shaft 28a of a beater 28.

The upwardly extending bifurcated ends 50b of the ejector plate 50 have their tips rounded as indicated at 50e and are adapted to bear against elongated, substantially parallel bearing ribs 51a on the rear surface of a movable operating member 51. This operating member 51 substantially fills a front opening 18d in the casing 18 of the mixer. This front opening is located almost entirely within the bottom part 18a of the casing and the top edge of the opening is exposed by removing the removable top part 18e of the casing.

The operating member 51 is mounted for oscillation rearwardly on two extending ends of a rod 52 that extend from the sides of the member 50 adjacent the top of the sides. These ends 52a are held in correspondingly shaped grooves that are positioned in the top edge of the bottom part 18a of the casing adjacent to the opening 18b. These ends of the rod are exposed when the top part 18e of the casing is removed as is illustrated in Fig. 4.

As can be seen from the drawing and from the above description, the ejector plate 50 is pivotally mounted about the front edge of the support member 48. Pivotal movement of this ejector plate 50 in a clockwise direction as shown in Fig. 3 causes the rear end 50c of the plate to move downwardly. This rear end engages collars 53 on each beater shaft 28 and forces the beater shafts downwardly. This small extent of movement of the beater shaft is sufficient to disengage the beaters from the spring locking means usually provided so that the beaters may be then withdrawn from engagement with the mixer by hand.

In order to hold the ejector plate 50 in retracted position, spring means is provided. In the embodiment shown, this spring means includes a spring 54 of the hairpin type having its two ends 54a extending through openings 48b adjacent to the top of the support member 48. The spring 54 then extends forwardly and downwardly between the bifurcated portions 50b and then extends rearwardly, with the middle portion 54b of the spring bearing upwardly against the bottom of the rear end portion of the ejector plate 50.

As can be seen from the above description, the spring 54 not only holds the ejector plate 50 in retracted position, but also urges the operating member 51 outwardly into its normally retracted position. Furthermore, this spring 54 holds the ejector plate 50 in its assembled position on the end of the support member 48.

In order to aid in holding the operating member 51 in its normal position as illustrated in the drawing, the bearing ribs 51a extend downwardly beyond the main body of the operating member 51 and engage the rear surface of the bottom part 18a of the casing adjacent to the opening 18b at the bottom thereof.

The mixer of this invention is provided with a handle 55 mounted on the top of the casing 18 and extending longitudinally thereof. This handle includes a central hand engageable portion 55a and a rear support 55b. The front end of the handle is supported on an upstanding post 56 having its lower end threaded into a threaded hole in the upper part of a casing portion 57 located between the gear box 23 and the motor housing 21. The upper end of the post 56 is attached to the handle 55 by means of a screw 58 whose head is recessed into a depression 55c in the top front part of the handle 55. This depression is normally covered by a removable cap 59.

The post 56 not only supports the handle 55, but also serves to mount rotatably a speed control knob 60. This control knob 60 is located between the front part of the handle 55 and the upper surface of the casing portion 18e. As is shown in Fig. 1 this control knob 60 is shaped to form an extension of the handle 55. The outer surface of the knob is provided with vertical ribs 60a in order to aid in grasping the knob for rotation thereof.

The sides of the knob 60 are made up of two depending portions 60b and 60c. The outer portion 60b carries the ribs 60a and has an outwardly extending annular rim 60d located adjacent to the upper surface of the casing portion 18e. This annular rim 60d carries a series of numbers which are adapted to register with a pointer 61 adjacent to this rim for indicating the relative speeds of the motor.

The inner knob portion 63 extends downwardly into the casing 18 through an opening 18g in the top part 18e of the casing. This opening is hidden by the outer knob portion 60b and the annular rim 60d.

The knob portions 60b and 60c are substantially concentric to the post 56. The inner portion 60c is provided with a plurality of projections, here shown as three, that are substantially circularly arranged. These projections 60e extend into similar openings 62a in a cam 62. This cam is rotatably supported about the bottom part of the post 56 and rest on the upper surface of the casing portion 57. This upper surface 57a and the cam 62 are transverse to the axis of the supporting post 56.

The outer edge 62b of the cam 62 describes a spiral. This edge progresses from a narrow recessed area 62c which corresponds to the "Off" position of the motor to a widest part 62d that is almost 360° away. This widest part 62d is adjacent to an outwardly extending stop 62e on the cam.

The edge 62b of the cam bears against the end 63a of a longitudinally slidable flat metal strip 63 which is movable longitudinally of the motor. This strip 63 is held within an elongated housing 64 that is positioned on top of the motor housing 21. The housing 64 is attached to the top of the motor housing 21.

When the cam 62 is rotated by rotating the control knob 60, the spiral edge 62b of the cam causes longitudinal movement in the strip 63. The rear end of the strip is bent down as indicated at 63b. This downwardly bent end is in contact with an adjustable screw 81 mounted in an upwardly extending metal strip 82 that is riveted to the block 78 between the two adjusting screws 78a.

In changing the speed setting of the motor the speed control knob 60 is rotated to the proper position indicated by the data on the slide plate 73 in the base of the mixer. Thus after the proper index number has been selected from the data on this plate to correspond with the desired beating operation, the knob 60 is turned until the number, here shown as the numeral "4," registers with the pointer 61 as shown in Fig. 2. This rotation of the knob 60 rotates the cam plate 62 and moves the control strip 63 longitudinally of the motor. The longitudinal movement of the strip 63 adjusts the position of the strip 82 and thus the spring arms 76 that carry the contact points 77. Where the control strip 63 is moved rearwardly to increase the motor speed, the contacts 77 bear with a relatively strong force against the contacts 75 because of the springy nature of the spring arms 76. The motor speed then increases and this speed causes rearward movement of the thimble 43 by operation of the speed governor in the manner specified. This rearward movement of the thimble causes rearward movement of the spring arm 44 and thus of the contacts 75 until the contacts 75 have been moved a sufficient distance that they break their electrical contact with the other points 77. When this occurs, the flow of electricity to the motor is interrupted and the motor has reached its maximum speed. The motor then operates at about this speed until the control knob is turned to a different speed setting.

The spring arms 44 and 76 maintain the contacts 75 and 77 in electrical contact with each other until the motor speed has increased to the point where the circuit through these contact points is broken. The spring arm 44 serves the additional function of urging the metal strip 82 and thus the control strip 63 forwardly at all times to hold the forward end 63a of the strip against the edge 62b of the speed control cam.

As has been pointed out above, the cam 62 rotates on the upper surface 57a of the casing portion 57. The cam is held in position on the surface by means of a divided spring washer 66 that is held in a groove 56a in the post 56 adjacent to the cam 62. Thus, in this construction, the cam 62 is rotatably held between the spring washer 66 and the surface 57a.

In order that a fruit juicer and other attachments may be removably mounted on the mixer, the top part 18c of the casing is provided with an opening normally closed by a removable closure piece 67. Upon removal of this closure piece 67, the stem of the fruit juicer or the like may be removably engaged with the slotted end 68a of a rotatable drive member 68 that is located within the gear box 23 for rotation by means of the gears 22 and 24. This construction of the drive member 68 and its cooperation with a fruit juicer or other attachment is purely conventional and forms no part of the present invention.

Electric power is supplied to the motor by means of a flexible cord 69 in the customary manner. This cord passes between the casing parts 18a and 18e and passes through a rubber grommet that is held in a depression in the edge 18h of the lower casing part 18a. This casing edge 18h is exposed when the upper casing part 18e is removed. This edge is normally hidden by a depending skirt portion 18i that defines the bottom edge of the top part 18e of the casing and overlaps this edge 18h.

The motor housing 21 is provided with front ventilating openings 21b. The rear of the housing is open so that ventilating air may flow in the customary manner. As is customary, a ventilating fan 83 is mounted on the rear plate 35 so that rotating of the motor will rotate the fan and set up this flow of ventilating air. The motor housing 21 also carries a pair of motor brushes 71 of the ordinary type.

As can be seen in Fig. 3, the bottom front part of the casing contains an opening 72 exposing the bottom of the gear box 23. This opening permits ready insertion of the beaters 28 into operative engagement with the driving mechanism within this gear box. The opening may be closed with a removable screen containing openings through which the beaters may be inserted and removed.

Mounted within the base 10 is a plate 73 having an upturned edge 73a on the outer end thereof. This plate is mounted for movement within a supporting bracket 74 on the bottom of the base 10. The edge 73a is outside the base 10 and permits ready grasping of the plate 73 so that it may be pulled outwardly from the base 10.

This plate 73 is adapted to contain mixing instructions keyed to the numbers on the rim 60b of the speed control knob 60. With this arrangement, the operator of the mixer has only to pull the plate 73 outwardly to expose the data thereon and can then see at a glance the proper speed control setting number to perform the desired mixing operation whether it is beating, folding or similar operations.

Having described my invention as related to the embodiments shown in the accompanying drawings, it is my intention that the invention be not limited by any of the details of description, unless otherwise specified, but rather be construed broadly within its spirit and scope as set out in the accompanying claims.

I claim:

1. In an electric mixer including a removable rotatable beater and an outer casing including a front opening, a beater ejector, comprising: a support member on the mixer within the casing; an ejector plate rockably mounted within the casing having one end adapted to engage a portion of the beater and move the beater away from the mixer on rocking movement of the plate and the other end extending toward said opening; an operating member oscillatably mounted in the opening for movement toward the interior of the casing and bearing against said other end of the ejector plate for thusly rocking said plate upon said movement of the operating member; and spring means urging said plate and operating member into their normally retracted positions.

2. The apparatus of claim 1 wherein the spring means has one end attached to the support member and the other end bearing against the ejector plate and urging said plate toward the support member, the spring means holding the ejector plate against the support member and the ejector plate being otherwise unattached thereto.

3. In an electric mixer including a removable rotatable beater and an outer casing including an opening, a beater ejector, comprising: a support member on the mixer within the casing; an ejector member rockably mounted about the support member having one part adapted to engage a portion of the beater and move the beater away from the mixer on rocking movement of the ejector member and an opposite part on the other side of said support member extending toward said opening; an operating member movably mounted in the opening for movement toward the interior of the casing and bearing against said opposite part of the ejector member for thusly rocking said ejector member upon said movement of the operating member; and spring means urging said ejector and operating members into their normally retracted position.

4. In an electric mixer including a removable rotatable beater and an outer casing including an opening, a beater ejector, comprising: a support member on the mixer within the casing; an ejector member rockably mounted about the support member having one part adapted to engage a portion of the beater and move the beater away from the mixer on rocking movement of the ejector member and an opposite part on the other side of said support member extending toward said opening; an operating member oscillatably mounted in the opening for movement toward the interior of the casing and bearing against said opposite part of the ejector member for thusly rocking said ejector member upon said movement of the operating member; and single spring means engaging said ejector member and urging the ejector member and thereby the operating member into their retracted positions.

References Cited in the file of this patent

UNITED STATES PATENTS

| | | |
|---|---|---|
| 2,048,455 | Knapp | July 21, 1936 |
| 2,293,959 | Wright | Aug. 25, 1942 |
| 2,515,755 | Krause | July 18, 1950 |
| 2,566,907 | Robertson | Sept. 4, 1951 |
| 2,568,774 | Sparklin | Sept. 25, 1951 |
| 2,586,841 | Mayer | Feb. 26, 1952 |
| 2,605,085 | Gerry | July 29, 1952 |